July 28, 1942.  E. DIBERT  2,291,380

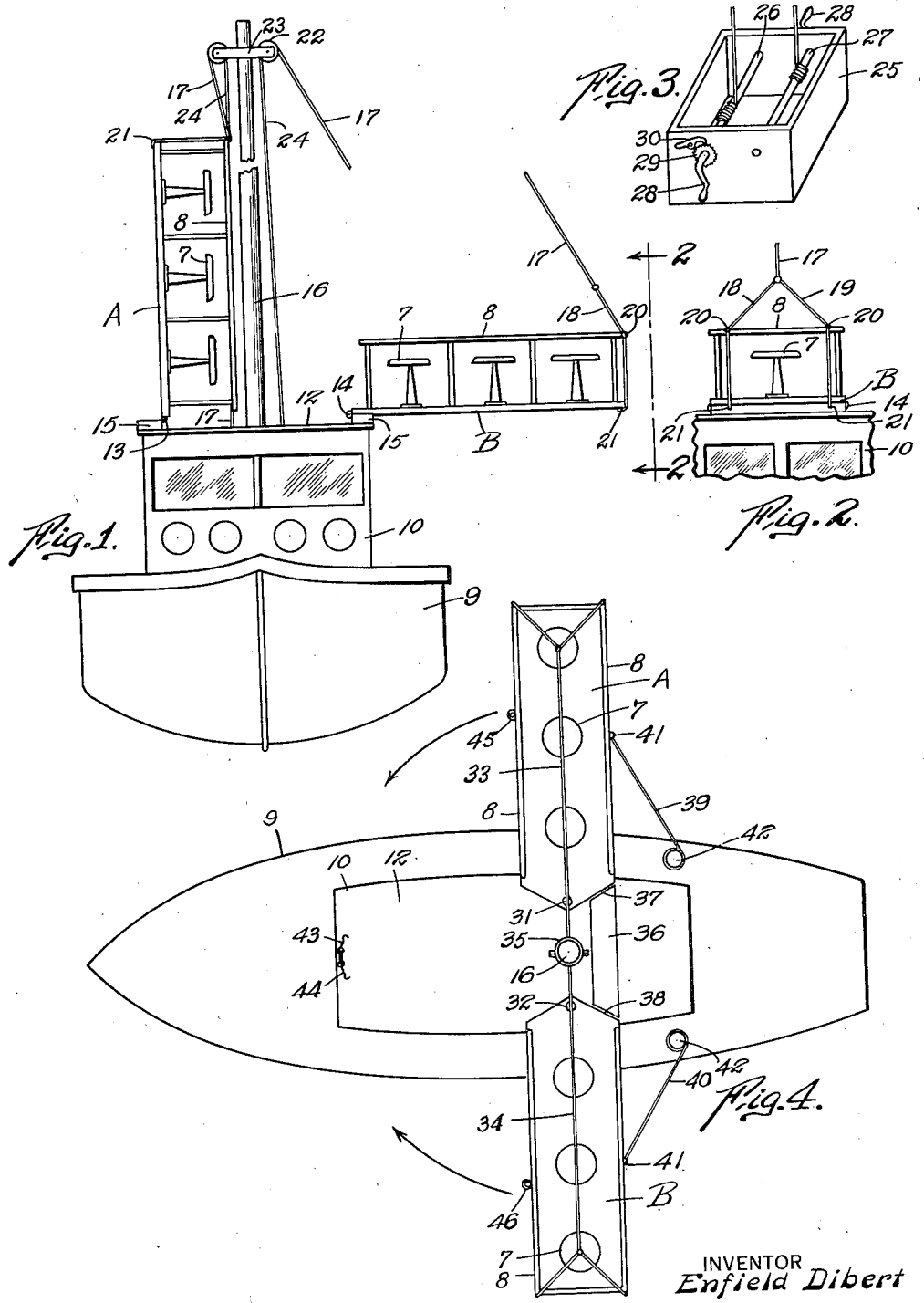

FISHING CRAFT

Filed Sept. 2, 1941  2 Sheets-Sheet 2

INVENTOR
Enfield Dibert
BY Zugelter & Zugelter
ATTORNEYS

Patented July 28, 1942

2,291,380

UNITED STATES PATENT OFFICE 2,291,380

FISHING CRAFT

Enfield Dibert, Bedford, Pa.

Application September 2, 1941, Serial No. 409,252

12 Claims. (Cl. 114—0.5)

The present invention relates to a fishing craft or vessel embodying certain improvements designed to enhance the commercial use of the vessel as a fishing craft.

One of the objects of the invention is to provide a vessel of the kind referred to, having superior accommodations and equipage for patrons interested in fishing and especially trolling from the vessel in motion.

Another object of the invention is to provide novel means of a simple and practicable nature, to be applied to a sports fishing vessel for increasing the patronage capacity of the vessel, while at the same time affording ample well-located space for the use of individual patrons fishing from the vessel. By thus enhancing the accommodations and providing for increased patron capacity, the per capita cost of a fishing expedition may be materially reduced, with the result of encouraging activity in the sport and making it available to persons of limited financial means.

Further objects of the invention are: to provide simple and inexpensive means for the accomplishment of the objects stated; to provide such means as may be readily applied to existing vessels without expensive rebuilding or remodeling thereof; to provide means for the purposes stated, which will not interfere with docking the vessel or impair the safety of patrons.

The foregoing and other objects are attained by the means described herein and disclosed in the accompanying drawings, in which:

Fig. 1 is a fragmental front view of a vessel embodying the device of the invention.

Fig. 2 is a fragmental side elevational view taken on line 2—2 of Fig. 1.

Fig. 3 is a perspective view of a winch or windlass forming an element of the invention.

Fig. 4 is a top view of a vessel embodying a modified form of the invention.

Figure 5:
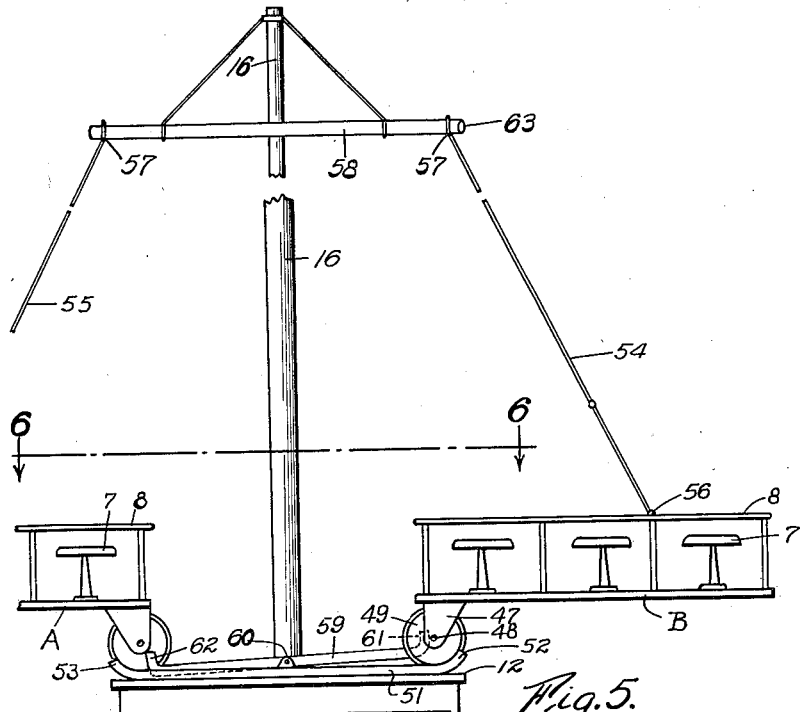
Fig. 5 is a fragmental front view of a vessel, showing a second modification, which may be preferable to Figs. 1 and 4.

The customary practice with respect to big game fishing, has been to utilize a relatively small vessel having a stern sufficiently broad to accommodate seats or chairs for several fishermen using trolling lines dragged behind the vessel while in motion. Ordinarily, only a limited number of patrons on the fishing excursion could be accommodated without experiencing difficulty incident to entanglement of lines and crowding of the space at the stern of the vessel. Due to the limitations mentioned, the cost of the excursion necessarily was pro-rated amongst a limited number of patrons, which resulted in a per capita cost considerably above the financial limitations of many patrons who would engage in the sport except for the prohibitive cost involved. The aforesaid limitations not only worked a hardship upon patrons of the sport, but also limited the financial returns of the vessel owner.

The present invention deals with the provision of means to increase the patron capacity of a vessel used for trolling or fishing purposes, while at the same time placing at the disposal of the patrons better accommodations and other advantages that may be enjoyed aboard a fishing vessel from which trolling is effected at the stern of the vessel. By means of the invention herein disclosed, the fisherman may enjoy all of the advantages above stated, and in addition, his location upon the vessel is rendered advantageous for maneuvering and keeping the catch in view at all times. Moreover, landing of the catch is facilitated to a considerable extent with the result that the probability of losing it is greatly minimized.

Briefly stated, the invention consists in furnishing, above the elevation of the hull of the vessel, one or more fishing platforms which may be extended beyond the sides of the vessel during use, and which may be retracted to locations within the body lines of the vessel when docking, or in navigating in crowded areas. Platforms, which in use are supported horizontally at a considerable elevation above the water line, furnish safe accommodations for the occupants thereof, particularly since they are out of reach of rough water, and above the line of collision with another vessel.

In each form of the invention disclosed, the fishing platform is extensible and retractable so as to present advantages when used for fishing, while in docking the vessel the platforms are disposed to non-interfering locations.

With reference to the accompanying drawings, it will be noted that all views disclose the common elements consisting of seats 7, platforms A and B with safety rails 8 extending upwardly therefrom, a vessel hull 9, and a vessel superstructure 10, which, as herein disclosed, may be in the form of a cabin having a roof or upper deck 12. The elements referred to are common to the various forms of the invention, so that they are properly indicated by similar reference characters upon all drawing views.

Considering first that form of the invention illustrated by Figs. 1, 2, and 3, it will be noted that the fishing platforms A and B are hinged at 13 and 14, respectively, at approximately the level of the deck 12 of the vessel superstructure. If desired, the hinges may be carried by suitable blocks or brackets 15 permanently fixed to the upper deck or roof 12. Patrons may ascend to the upper or roof deck 12 by using a ladder which is not shown on the drawings, but which is customarily furnished upon the majority of vessels having decks sufficiently large to sustain loads comparable with the weight of passengers.

It will be noted that the pivotal mountings 13 and 14 for the platforms, are preferably located at a distance from the mast 16, such that the platforms may be swung vertically through an arc toward and from the mast as indicated by Fig. 1 which shows one of the platforms in the inoperative position for docking purposes, and the other indicated at B, in the operative or use position which it assumes when carrying patrons engaged in fishing or trolling. The safety rail of each platform preferably furnishes an enclosure which is open at the inner end of the platform, as evidenced by reference to Fig. 4, and closed at the outer end for safety purposes.

Suitable means are provided for supporting the outermost end of each platform, one form of which means may consist of a hoisting cable or the like 17, having divergent end portions 18 and 19 (Fig. 2) secured to the rail at the points 20, and to the platform at the points 21. The cable, or rope as the case may be, might be utilized for hoisting the platform as well as for providing a support to maintain a horizontal condition of the platform. If the rope or cable be utilized merely as a guy, then means separate therefrom might be employed in elevating and lowering the platform. As disclosed herein, however, the rope or cable 17 passes over a pulley 22 supported upon a crossbar 23 at the mast head, and depends as at 24 toward the deck of the vessel in order to be accessible for elevating and lowering of the platform.

By preference, though not of necessity, there may be utilized at any suitable location upon the vessel, a winch or windlass 25 such as is illustrated by Fig. 3, for winding up the rope or cable ends in manipulating the platforms toward and from the operative positions. The simple form of winch or windlass illustrated by Fig. 3, may consist of a suitable frame in which are rotatably supported the pair of shafts 26 and 27, each adapted to form a reel for the rope or cable of a fishing platform. Each shaft 26 may be furnished with a crank or other manipulating means 28, and a ratchet mechanism which may consist of a ratchet wheel 29 and a pawl 30 engaging it, for maintaining a desired horizontal position of a platform. The pawl may be manually tripped to permit free rotation of the shaft when lowering the platform to the horizontal or operative position, and when the desired position is established, the pawl may be permitted to engage the ratchet wheel and maintain the platform in the desired position.

It should be understood that each of shafts 26 and 27 may include a ratchet mechanism such as above described, or any equivalent means of limiting the downward movement of the platform toward the water line. It should be further understood that the apparatus of Fig. 3 is illustrative only, of means for maintaining the platform in position, it being readily appreciated that many equivalents of the winch or windlass might be resorted to for the purpose intended. Likewise, the invention contemplates the use of means other than the rope or cable 17 for supporting the platforms in the extended positions.

Referring to the modified form of the invention illustrated by Fig. 4 the fishing platforms A and B are similar to the platforms of Figs. 1 or 2 except for a difference in the pivotal mountings thereof upon the upper or roof deck of the vessel superstructure. In Fig. 4, the pivots 31 and 32 are vertical, and permit swinging of the fishing platforms A and B as indicated by the arrows to inoperative positions lengthwise of the upper deck 12 while the supporting ropes or cables 33—34 remain fixed to the mast head at the fastening ring 35. The divergent outer ends of the ropes or cables may be secured to the outer ends of the platforms as explained in connection with Figs. 1 and 2, if desired.

The character 36 indicates one form of means providing a stop for limiting pivotal movement of the platforms A and B toward the stern of the vessel, and such means may be in the form of a block or other abutment adapted to engage the platform edges at 37 and 38. For holding the platforms against the stops at 37 and 38, any suitable means may be provided, for example the ropes or cables 39 and 40 having their outer ends fixed as at 41 to the platforms, and their inner ends tied or otherwise secured to posts 42 or other stationary parts of the vessel.

It should readily be understood by reference to Fig. 4, that in docking the vessel the holding means 39—40 will be released, and the platforms A and B swung horizontally until they assume inoperative positions lengthwise of the deck 12, thereby to dispose the platforms to positions within the body lines of the vessel. If desired, means may be provided for holding the platforms in said inoperative positions, there being illustrated by way of example a pair of hooks 43—44 adapted to be engaged with eyes or loops 45 and 46, respectively, fixed to the body portions of the platforms. Any other form of holding means might be employed for this purpose, and it should be understood that the invention contemplates the numerous equivalents available for the purpose. It is also contemplated within the scope of the invention, that the pivotal mountings 31 and 32 of the platforms might be disposed forwardly of the deck 12, rather than rearwardly thereon, in order that the platforms might be swung toward the stern of the boat rather than toward the bow thereof in disposing them to the inoperative or retracted positions.

Figure 6:
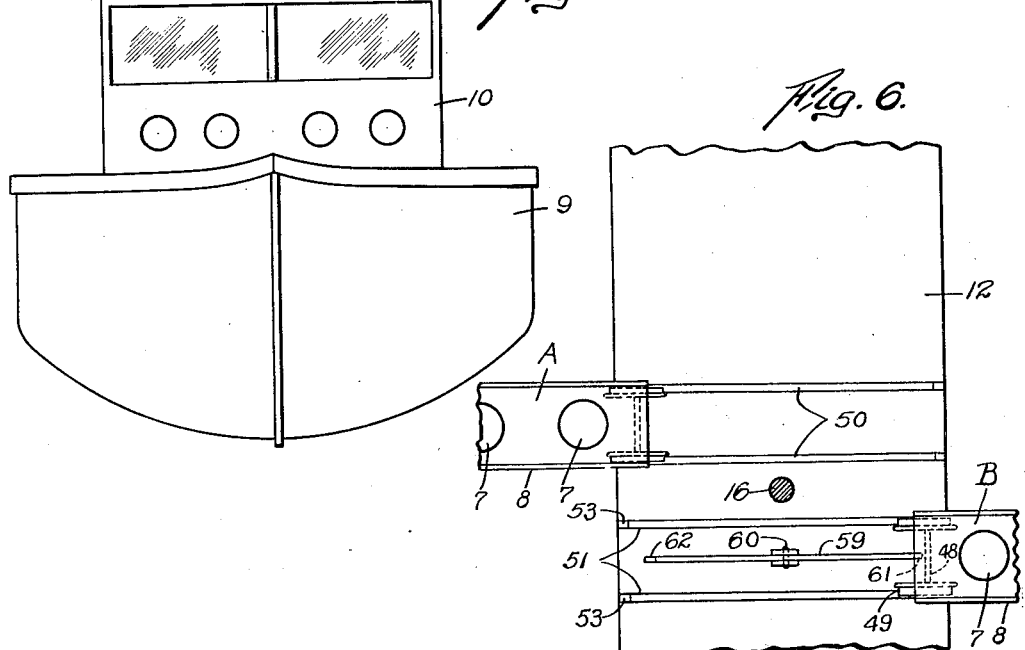
Fig. 6 is a fragmental cross-sectional view taken on line 6—6 of Fig. 5.

In the modifications of Figs. 5 and 6, which presently is considered the preferred construction, each platform is tractionally supported at its inner end, so as to be capable of rolling transversely of the deck 12, toward and from extended and retracted positions. In the embodiment shown by way of example, each platform carries a pair of depending brackets 47, each pair being spanned by an axle 48 upon which is mounted a pair of flanged wheels 49, all of which is most plainly illustrated by Fig. 6. Upon the roof or top deck 12 of the vessel, pairs of tracks 50 and 51 may be fixed so as to extend transversely of the deck, and upon these tracks the flanged wheels of the platforms are adapted to ride in extending and retracting the platforms. Suitable stops 52 and 53 are furnished at the opposite ends of each pair of tracks or guides, in order that the wheels may not leave the ends thereof. Such stops may be furnished by the simple expedient of turning upwardly the terminal ends of the rails or guides, as shown.

Suspending means for the platforms may comprise the depending ropes or cables 54 and 55, having their lower divergent ends fixed to the platforms as at 56, while the upper ends 57 are secured to the mast head or to some constituent part thereof, such as the crossbar 58, it being unnecessary to furnish a winch or windlass in connection with the Fig. 5 construction, since the platforms do not necessarily require elevating of their outer ends for disposal of the platforms to the inoperative positions. The suspending means 54 and 55 may be simply in the form of cables or ropes of proper length having opposite ends fixed to the mast head and to some appropriate anchorage upon the platforms. Although the retraction of the platform B, Fig. 5, might be accompanied by a slight lowering of the outer end as the platform moves to the inoperative or retracted position, this is not necessarily objectionable since the platforms are unoccupied when moving along the rails.

Means are to be provided for locking or latching the platforms in both the extended and the retracted positions, and such means may assume various forms as may be understood. For the purpose of a complete disclosure, a locking or latching means is shown associated with the platform B, but is omitted from the platform A assembly in order to avoid confusion in the drawing. It will be understood, however, that platform A will include a locking or latching means which may be identical with that illustrated in connection with platform B assembly. Referring to Fig. 5, the means illustrated for holding the platform in position comprises a bar 59 pivoted upon a fulcrum 60 substantially at its middle point, so that the bar may be rocked in a vertical plane. At one of its ends, the bar carries an upstanding arm or extension 61 which, when the bar is tilted as shown, engages the axle 48 and prevents movement of platform B to the left. To release the platform B for movement to the inoperative position, at which the platform extends substantially across the deck 12, it is necessary only to rock the bar 59 clockwise about its pivot 60, thereby lowering the extension 61 out of the path of movement of axle 48. The platform B then may be shifted to the left until its wheels reach the stops 53 at the opposite side of deck 12.

An upward extension or abutment 62 at the opposite end of bar 59 is so proportioned as to rise behind the axle 48 of platform B upon rocking the bar 59 after the platform has assumed the full inoperative or retracted position. Thus, by manipulating the bar 59 about its pivotal mounting 60, the platform B may be securely held in either the extended or retracted positions.

Any other form of locking or holding means may be furnished for holding the platform B as above related, and it will readily be understood that similar means may be furnished in connection with platform A and its guides or tracks 50.

In using ropes or cables such as 54 and 55 for suspending the platforms from above, it may be necessary to turn the crossbar 58 at an angle to the beam of the vessel, as shown in Fig. 5, in order that the ends of the crossbars may be disposed directly above the center line of the tracks or guides 50 and 51. The crossbar 58 is so illustrated, as evidenced by the fact that its end 63 is seen in perspective. In the event that it be considered impractical upon certain types of vessels to suspend the platforms as herein illustrated, the same effect may be obtained by the use of suitable props or braces arranged to support the outer ends of the platforms from the hull or main deck of the vessel.

Various other modifications and changes may be made in the structural details, within the scope of the appended claims, without departing from the spirit of the invention.

What is claimed is:

1. A fishing vessel having a main deck and an elevated deck, and including in combination a pair of narrow platforms pivoted upon the vessel at substantially the level of the elevated deck, for horizontal movement from an inoperative position substantially within the body lines of the vessel, to an operative horizontal position of extension beyond the vessel sides, and in overhead relationship to the main deck, seats on the platforms to enable fishermen seated thereon to manipulate fishing lines depending from the platforms at the sides of the vessel, a mast extending upwardly from the elevated deck at a location near the platform pivot points, and suspension means depending from a high point of the mast to those ends of the platforms opposite the pivoted ends, for maintaining a substantially horizontal disposition of the platforms as the latter are swung toward and from the operative and inoperative positions stated.

2. In combination with a fishing vessel having an elevated deck above the main deck, a pair of movable platforms pivoted to said elevated deck for movement from a position at which the platforms substantially wholly overlie said elevated deck, to extended positions at which the platforms overhang the side edges of the elevated deck, means supporting the platforms substantially horizontally in the overhanging extended positions, and a series of seats arranged upon the platforms for movement therewith.

3. In combination with a fishing vessel having an elevated deck above the main deck, a pair of movable platforms pivoted to said elevated deck for movement from a position at which the platforms substantially wholly overlie said elevated deck, to extended positions at which the platforms overhang the side edges of the elevated deck, means supporting the platforms substantially horizontally in the overhanging extended positions, and a series of seats arranged upon the platforms for movement therewith, the platforms being of a width not substantially in excess of the space required for seating patrons in fishing position facing the stern of the vessel.

4. A fishing vessel which includes in combination with an upper deck thereof, a pair of narrow platforms each carrying a plurality of seats to accommodate fishermen, means shiftably supporting one end of each platform for bodily horizontal movement of the platforms transversely across the upper deck, from positions of extension beyond said deck to positions of retraction substantially within the limits of said deck area, means to selectively hold the platforms in each of the said positions, and means supporting the opposite ends of the platforms in substantially horizontal position when the platforms are extended.

5. A fishing vessel having a mast and an elevated deck above the main deck of the vessel, and including in combination therewith a pair of narrow platforms each carrying a plurality of seats to accommodate fishermen, means pivoting one end of each platform to the vessel at approximately the level of said elevated deck whereby the platforms are supported for arcuate movement from horizontal to upright positions, the platforms in upright position being in substantial parallelism with the mast of the vessel, and being in the horizontal position extended outwardly to overhang the main deck, the seats moving with the platforms to both said positions and means supporting the overhanging ends of the platforms when extended.

6. A fishing vessel having a mast and an elevated deck above the main deck of the vessel, and including in combination therewith a pair of narrow platforms each carrying a plurality of seats to accommodate fishermen, means pivoting one end of each platform to the vessel at approximately the level of said elevated deck whereby the platforms are supported for arcuate movement from horizontal to upright positions, the platforms in upright position being in substantial parallelism with the mast of the vessel, and being in the horizontal position extended outwardly to overhang the main deck, the seats moving with the platforms to both said positions and means supporting the overhanging ends of the platforms when extended, said supporting means comprising a line suspended from the mast and means for reeling in said line to elevate the platforms and dispose them in the upright positions to facilitate docking the vessel.

7. A fishing vessel having a mast and an elevated deck above the main deck of the vessel, and including in combination therewith a pair of narrow platforms each carrying a plurality of seats to accommodate fishermen, means pivoting one end of each platform to said elevated deck whereby the platforms are supported for arcuate movement in substantial parallelism with and over said elevated deck, each platform being thereby movable from a position in substantial parallelism with the keel of the vessel to a position of overhang transversely of the keel, and suspension means on the mast for supporting the unpivoted ends of the platforms as the platforms are swung to and from the positions stated.

8. A fishing vessel having a main deck and an elevated deck, and including in combination a pair of narrow platforms pivoted upon the vessel at substantially the level of the elevated deck, for horizontal movement from an inoperative position substantially within the body lines of the vessel, to an operative horizontal position of extension beyond the vessel sides, and in overhead relationship to the main deck, seats on the platforms to enable fishermen seated thereon to manipulate fishing lines depending at the sides of the vessel, a mast extending upwardly from the elevated deck at a location near the platform pivot points, and suspension means depending from a high point of the mast to those ends of the platforms opposite the pivoted ends, for maintaining a substantially horizontal disposition of the platforms as the latter are swung toward and from the operative and inoperative positions stated, means for limiting the swinging of the platforms to the operative position of extension beyond the vessel sides, and releasable means for holding the platforms at extended positions determined by said limiting means.

9. In combination with a fishing vessel having an elevated deck above the main deck of the vessel, a pair of movable platforms each having an end thereof pivoted upon the vessel at substantially the level of the elevated deck for movement horizontally from an inoperative position at which the platforms substantially parallel the length of said elevated deck, to an operative position of extension at which the platforms project outwardly beyond the vessel sides and over the main deck, at approximately the level of the elevated deck, and a series of seats arranged upon the platforms for bodily movement therewith, for accommodating patrons in fishing position beyond the sides of the vessel at the elevated deck level, when the platforms are operatively extended.

10. In combination with a fishing vessel having an elevated deck above the main deck of the vessel, a pair of movable platforms each having an end thereof pivoted upon the vessel at substantially the level of the elevated deck for movement horizontally from an inoperative position at which the platforms substantially parallel the length of said elevated deck, to an operative position of extension at which the platforms project outwardly beyond the vessel sides and over the main deck, at approximately the level of the elevated deck, and a series of seats arranged upon the platforms for bodily movement therewith, for accommodating patrons in fishing position beyond the sides of the vessel at the elevated deck level, when the platforms are operatively extended, means for limiting the swinging of the platforms to the operative position of extension, and releasable means for holding the platforms at extended positions determined by said limiting means.

11. A fishing vessel which includes in combination with an upper deck thereof, a pair of narrow platforms each carrying a plurality of seats to accommodate fishermen, said platforms each having wheels at one of its ends, track means for each platform arranged over said upper deck transversely of the length of the vessel, and adapted to support the wheels of the platforms for bodily movement of the platforms from positions of extension beyond said upper deck to positions of retraction substantially within the limits of said deck area, means to selectively hold the platforms in each of said positions, and means supporting the opposite ends of the platforms in substantially horizontal position when the platforms are extended.

12. A fishing vessel which includes in combination with an upper deck thereof, a pair of narrow platforms each carrying a plurality of seats to accommodate fishermen, said platforms each having wheels at one of its ends, and each having an opposite end to overhang the sides of the vessel, track means for each platform arranged over said upper deck transversely of the length of the vessel, said track means of each platform being disposed in substantial parallelism one with the other and adapted to support the wheeled ends of the platforms for bodily movement of each platform from a position of extension of its said opposite end outwardly beyond said upper deck and a side of the vessel, to a position of retraction at which latter position the platforms are disposed side by side substantially within the limits of said deck area, means to hold the platforms in each of said positions, and means supporting said opposite ends of the platforms in substantially horizontal positions when the platforms are extended.

ENFIELD DIBERT.